United States Patent
Low et al.

[15] 3,657,549
[45] Apr. 18, 1972

[54] TWO-COLOR HORIZON SENSOR

[72] Inventors: George M. Low, Deputy Administrator of the National Aeronautics and Space Administration in respect to an invention of; Harold H. Seward, 16 Frost Street; Mark Gorstein, 60 Spy Pond Lane; Ian G. Mc-Williams, 19 Eastern Avenue, all of Arlington, Mass. 02174

[22] Filed: May 21, 1970

[21] Appl. No.: 39,344

[52] U.S. Cl. ............... 250/209, 250/83.3 UV, 250/226, 350/203
[51] Int. Cl. ............................................. H01j 39/12
[58] Field of Search ............... 250/209, 226, 83.3 UV; 352/203

[56] References Cited

UNITED STATES PATENTS

| 3,316,412 | 4/1967 | Hirschberg | 250/226 |
| 3,174,045 | 3/1965 | Whitney et al. | 250/209 |
| 3,229,566 | 1/1966 | Hutchinson et al. | 250/226 X |
| 986,642 | 3/1911 | Moller | 350/203 |
| 1,687,030 | 10/1928 | Mitchell | 350/203 X |
| 3,381,569 | 5/1968 | Hatcher | 250/209 X |

*Primary Examiner*—Archie R. Borchelt
*Attorney*—Herbert E. Farmer and John R. Manning

[57] ABSTRACT

A radiant energy sensor which may be employed to detect discrete radiant energy wavelength bands from a selected portion of a radiating body such as the horizon. As radiant energy from various portions of the body is detected, the energy is analyzed according to its color characteristics by means of a double monochrometer. A combination lens-prism system is used to refract the radiant energy according to its wavelength. Photo detectors in the double monochrometer respond to two selected wavelength bands of the radiant energy and are connected to a difference amplifier to determine the null output of the two detectors. The null condition is adjusted to correspond with the discrete wavelength bands to be sensed.

25 Claims, 3 Drawing Figures

TWO-COLOR HORIZON SENSOR

ORIGIN OF THE INVENTION

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

1. Field of the Invention

This invention relates to a radiant energy sensor such as a horizon sensor which is employed for detecting discrete energy bands in a radiating body. More particularly, the invention relates to an optical sensor which employs a color determination process for locating or identifying a particular radiant body or its properties.

2. Description of the Prior Art

Radiant energy detectors have numerous uses in fields of science and engineering where the characteristics of a body must be observed from a distance or where the objects themselves are to be examined by nondestructive means. If the radiant characteristics of the body are peculiar to properties to be measured, the sensing of the radiant energy provides a favorable method for measuring the characteristics.

Horizon sensors which are used for navigation, particularly for edge tracking of a planet horizon such as the earth's horizon are not new. Recent advances in space travel have prompted significant developments in the horizon sensing area.

One horizon sensor employing infrared radiation is disclosed in U.S. Pat. No. 3,418,478. In this system, infrared radiation is detected by means of two stationary fields of view separated by a fixed elevation angle. The fields of view are alternately sampled optically or electronically by an infrared detector to generate correction signals for maintaining the desired positioning of the fields of view.

The prior art horizon sensors employ infrared radiation as the information medium. Such radiation is subject to variation due to heating effects of the sun and the earth. Since accuracy is especially critical in navigation of spacecraft, an improved horizon sensor with less sensitivity to variable horizon characteristics is desired.

It is an object of the present invention to disclose a radiant energy sensor having improved sensitivity and accuracy.

It is an object of the present invention to disclose an optical sensor capable of detecting discrete wavelength bands in a body having particular color characteristics.

It is an object of the present invention to disclose a horizon sensor which employs a color band detection mechanism for precisely locating a specific altitude above the horizon.

It is also an object of the present invention to disclose a horizon sensor which is less sensitive to changes in atmospheric conditions than infrared sensors.

It is also an object of the present invention to disclose a horizon detector employing a dual monochrometer which separates characteristic color band components found near the earth-horizon.

It is still a further object of the present invention to disclose a horizon sensor which employs a portion of the horizon color spectrum to provide a stable horizon detection signal.

SUMMARY OF THE INVENTION

The novel radiant energy sensor is composed principally of an image forming system which samples a portion of the energy radiated by a body, a prism-lens combination or dispersyn for refracting the sampled energy in a chromatic pattern, two photo detectors positioned to detect specific color bands and a solid state comparator to provide a signal having a null condition at a selected ratio of given wavelength bands.

The image forming system includes an objective lens which focuses the sampled radiant energy on an aperture plate. Where a horizon reference is sought, the aperture is small enough to accommodate radiant energy from a limited region of the horizon without incurring an undue signal-to-noise ratio at the null condition. Radiant energy passing through the aperture plate is then passed to a double monochrometer where it is collimated and refracted by the dispersyns. The refracted rays are then sensed by the two photo detectors positioned in the refracted beam of the dispersyns so that specific color bands can be detected. The detectors are connected to the solid state comparator. Where the horizon reference is sought, the comparator is calibrated to provide a null signal when the characteristic color radiation from a selected altitude above the horizon appears in the field of view of the sensor. The difference signal provided by the comparator as a function of altitude has a characteristic "S" shape so that the signal may be used as an attitude or navigational aid.

BRIEF DESCRIPTION OF THE DRAWINGS

The novel radiant energy sensor and its method of operation will be better understood by reference to the following drawings in which the same element bears the same reference numeral throughout the several figures:

FIG. 3 is a graph of the output produced by the sensor as the field of view of the sensor is scanned from space through the atmosphere to the earth.

DESCRIPTION OF THE PREFERRED EMBODIMENTS

The radiant energy sensor of the present invention is suitable for a number of functions in various fields of science and engineering where radiant energy is to be measured. Because of its particular utility as a horizon sensor, the novel sensor is described hereinafter in the environment of a horizon reference instrument. As will be understood by those skilled in the art, many other embodiments of the invention are contemplated.

The atmosphere at the earth-horizon has a characteristic color spectrum which may be detected by the radiant energy sensor. The color characteristics of the atmosphere vary with altitude, H in FIG. 1, and therefore the sensor may be used to accurately locate the horizon. The advantage of using a color determination for a horizon indication is principally that the altitude for a particular color is essentially unchanged with changes in horizontal light intensity due to the sun rays at various times during the day, latitude, polarization, and the albedo variations of the earth. If brightness alone were used to detect the horizon, these variations would cause significantly greater errors.

Figure 1:
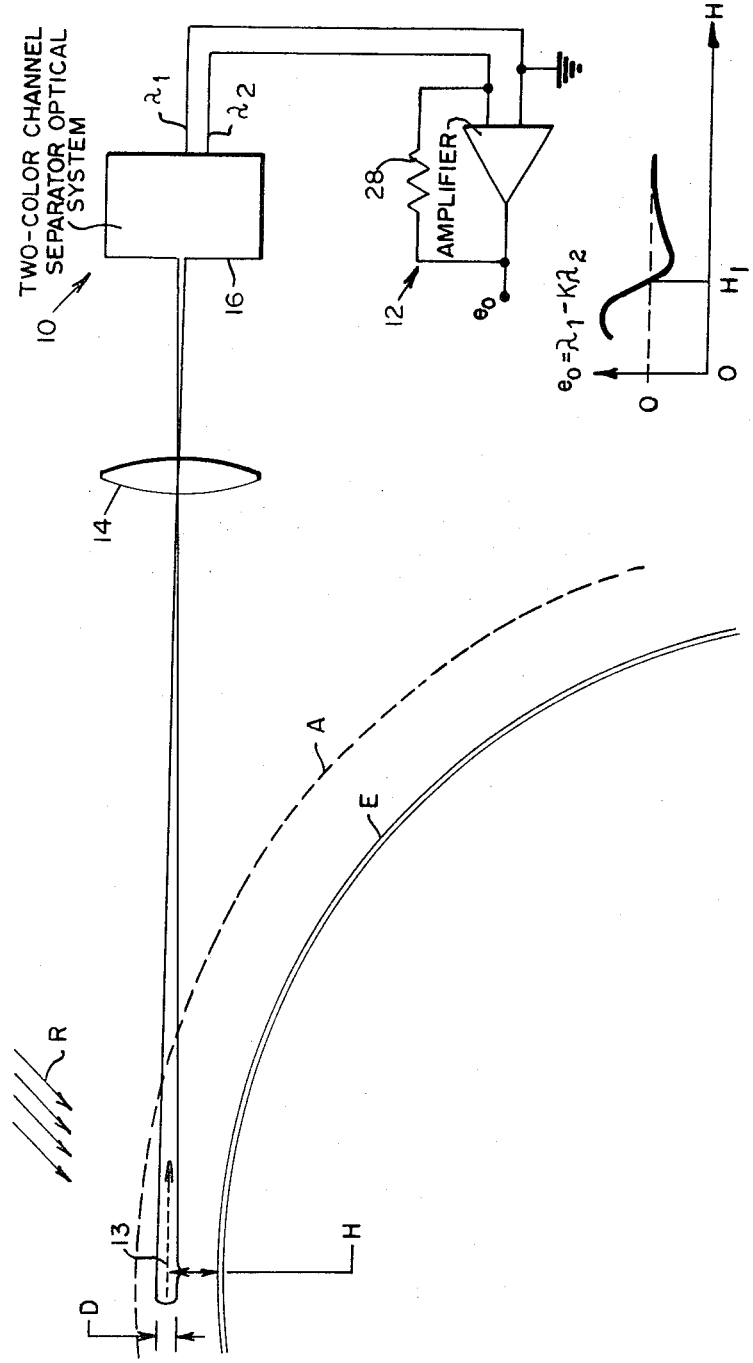
FIG. 1 is a diagrammatic representation of the radiant energy sensor as employed for detecting the earth-horizon from a point in space.

FIG. 1 provides an overall view of the novel radiant energy detector as employed for either sensing or tracking the earth-horizon. The sensor is shown positioned in space at a point above the earth E. The sensor could be mounted, for example, in a spacecraft which is approaching the earth. The atmosphere surrounding the earth extends to the dashed line designated by the letter A. Sun rays are designated by the letter R.

The sensor is composed of an optical system, generally designated at 10, and an electronic signal comparator, generally designated at 12. The optical system 10 has a sensitive axis 13 along which scattered light from the atmosphere passes to the sensor. The light enters the optical system 10 at an objective lens 14 which focuses the light on an aperture plate 16 behind the objective. The slit in the center of the aperture plate 16 subtends a small angle which limits the sampled portion of the atmosphere to the dimension D. In one embodiment of the sensor, the slit subtends an angle of 3.3 milliradians. With such a slit, the dimension D is approximately 5 km when the sensor is approximately 1,500 kilometers from the sampled region.

Figure 2:
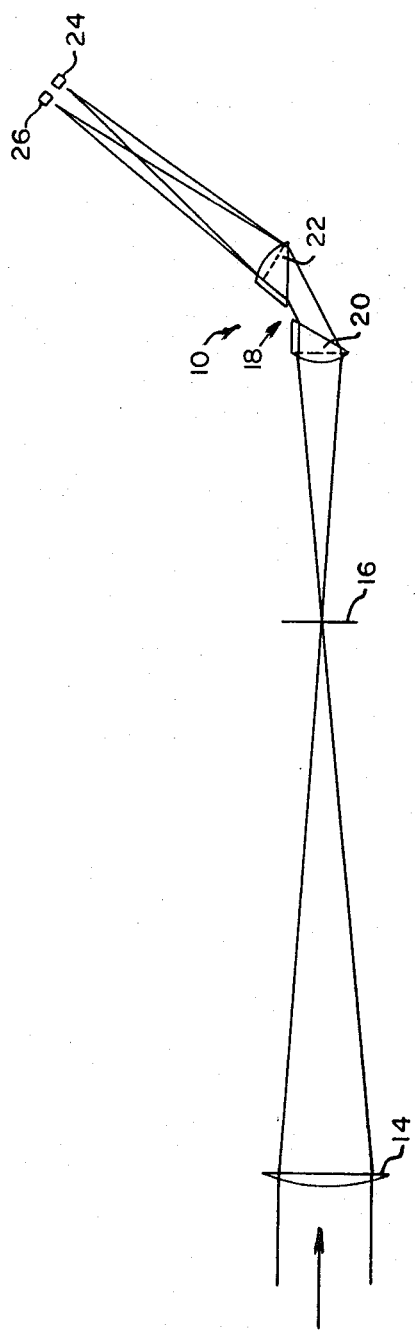
FIG. 2 is a detailed view of the sensor showing the principal optical components of the system.

FIG. 2 discloses the optical system 10 in greater detail. The sampled radiant energy from the horizon enters the objective lens 14 and is focused in an image at the aperture plate 16. The slit in the plate 16 must provide an image of the horizon which is sufficient to give meaningful data. Sufficient energy must be collected and passed through the slit to provide reasonable signal-to-noise ratio at the null condition.

The light energy which is transmitted through the aperture of plate 16 then passes to a refraction system 18. The system 18 is composed of two lens-prism combinations known as dispersyns. The dispersyn has a lens portion represented by the concave side of element and a prism portion represented by the triangular side of the element. The dispersyns are single optical pieces cut from peripheral regions of a larger convex lens. The pieces are formed by first boring an aperture through the center of the large lens and then cutting segments from the remaining portion of the large lens. The dispersyn performs the function of a separate lens and prism. In other words, the light rays from the focal point of the lens portion are focused or collimated and then refracted by the prism portion. Normally a separate lens and prism are required to accomplish the focussing and refracting functions. The first dispersyn 20 collimates the light forming the image in the slit of the aperture plate 16 and refracts the light. The second dispersyn 22 also refracts the collimated light rays and the refracted rays are subsequently focussed at a plane in which the two photo cells 24 and 26 have been positioned. It will be noted that the dispersyns 20 and 22 are positioned so that the double refractions of the light are additive, that is the refraction provided by dispersyn 20 is increased by the refraction of the prism of dispersyn 22.

It is a well known principal that the light having the shorter wavelength is refracted through a larger angle than light having a longer wavelength. As a result, the sampled light radiation from the horizon is distributed in a spectrum at the focal plane of dispersyn 22. By locating the two photo cells 24 and 26 in this focal plane, the portion of the short wavelength light detected by cell 26 is greater than that detected by cell 24. By appropriate positioning and separation of the photo detectors 24 and 26, discrete wavelength bands can separately be detected. The apparatus including the dispersyns and the two detectors accordingly forms a double monochrometer.

It will be understood that to provide the collimated beam between the dispersyns 20 and 22, it is necessary to position dispersyn 20 a distance equal to its focal length from the horizon image in the aperture plate 16. The distance between the dispersyns is arbitrary since the beam is collimated and need only be sufficient to keep scattered light to a low level. The entire optical system is enclosed in a black body box to eliminate light from sources other than the objective lens 14. The distance from the second dispersyn 22 to the detectors is also equal to the focal length of the dispersyn so that the total length of the optical system is slightly longer than two focal lengths. This distance can be shortened by means of a reflective coating on the dispersyn 22 so that the reflected signal passes back through the dispersyns to a focus near the aperture plate 16. However, the focal length is still a large fraction of the overall length of the sensor and placing the detectors near the aperture plate would be difficult.

The photo detectors 24 and 26 may be silicon photo cells which possess a stronger sensitivity for some wavelengths than for others. In one embodiment of the invention, the photo detector 24 is positioned to detect the stable wavelength band to which the detector is most sensitive. This greater sensitivity permits the difference signal of the two detectors to have a significant slope at the null condition and therefore the null condition can be detected with greater sensitivity. To this end, a suitable ratio of detector areas is arranged so that the expected peak signal from the short wavelength band detector 26 is about 0.7 of the peak signal from the long wavelength band detector 24. The selection of the wavelength bands insures that at a certain altitude, $H_1$ selected for its potential stability, the signal from the short wavelength band has just reached its peak and the signal from the other band is at 0.7 of its nominal peak and is increasing rapidly. Thus, if the two detector outputs are subtracted, a zero crossing of maximum sensitivity occurs at the altitude selected for its potential stability.

The comparator 12 shown in FIG. 1 is a low noise, chopper stablized operational amplifier with feedback resistor 28. One such amplifier which may be employed is a Model 230K from Analog Devices. The two signals from the detectors 24 and 26 are connected in opposition to the inputs of the amplifier so that the output is a comparison or difference signal. The amplifier gains are adjusted so that the null or zero signal occurs at the altitude $H_1$ selected for its potential stability. The differential current expression at the null condition is $\lambda_1 - K\lambda_2$, where the K represents 0.7 factor associated with the signal from detector 24. As discussed above, the constant K is chosen so that a null occurs at an altitude where the function is changing most rapidly. It will be understood, that by changing the separation of the detectors 24 and 26, the color bands, generally $\lambda_1$ and $\lambda_2$, which are to be detected can be changed and the comparison factor K may need to be accordingly adjusted.

FIG. 3 discloses the output of the comparator 12 as a function of altitude scanned by the horizon sensor. As the sensor points at empty space or high altitudes above the atmosphere, there is no image at the aperture and consequently no signal from either detector. The output of the comparator 12 is zero. As the image of the horizon characterized by the color bands of the atmosphere begins to fall on the aperture, the photo detector 26 sampling the short wavelength bands begins to respond first. As lower altitudes are reached the second detector starts responding and the difference signal output peaks. The signal then begins to decrease rapidly as the second detector 24 with its higher sensitivity approaches its own peak. At the selected altitude, the two signals are equal and a zero crossing occurs on the graph. The slope of the curve at the zero crossing is large since the detector 24 is at approximately seven-tenths of its peak value and is rising rapidly.

If the detectors 24 and 26 are the silicon photo diodes mentioned above, maximum sensitivity occurs at wavelengths in the region of 480–500 nanometers. The detector 24 is positioned in the focal plane of dispersyn 22 to detect refracted light in this wavelength band. A suitable separation of the detectors 24 and 26 which permits good measurement results at the null condition places the radiant energy band for the short wavelength detector 26 in the region of 340–380 nanometers.

As the null point is passed scanning downwardly into the horizon, the differential signals from the detectors passes through a null to a high positive peak. Because of its shape, the plot is known as an "S" curve. Of course, the curve may be inverted without affecting the results. The response is quite unpredictable when the line of sight of the sensor passes onto the earth, although the long wavelength detector output dominates the signal until the opposite horizon is reached and a null crossing again occurs. While scanning the earth it is possible that the signal may drop into the noise region and false zero crossings may occur.

The horizontal sensor as described above provides a very accurate horizon reference by keying the null signal to a known altitude having color characteristics that are selected for their potential stability. Error analysis indicates that the horizon may be detected in terms of elevation above the horizon level in the order of 0.2 kilometers rms. The system can be used for accurately navigating or determining attitude of a space vehicle approaching or traveling away from the earth. It may also be used in a spinning satellite orbiting the earth and for other tracking purposes.

The horizon sensor may find utility in other situations where a radiance ratio detector is required to measure an energy ratio of any two wavelength bands. For example, it is known that certain hydrocarbons from pollution sources, such as automobiles, selectively absorb in the ultraviolet region. The sensor could be modified to be used as a portable local air pollution monitor. Another possible application of the sensor concept is to monitor the build-up of any selective absorbing gas. Here the sensor could be applied to such diverse fields as process control and mine safety. Therefore, while the sensor has been disclosed in a particular embodiment suited to horizon detection, it may be modified according to other particular needs. It should be understood that while specific wavelengths and distances have been disclosed, the invention is not so limited and may be varied to suit other colors and system sensitivities. Accordingly, the present invention has been described by way of illustration rather than limitation.

What is claimed is:

1. Apparatus for sensing discrete radiant energies from a radiating body comprising:
   sampling means for capturing radiant energy from a selected portion of the radiating body;
   wavelength dispersive refracting means for separating the captured radiant energy in a detection plane according to the wavelength of the radiant energy; and
   detecting means at selected locations in the detection plane for sensing the radiation at two selected wavelength bands.

2. Apparatus for sensing discrete radiant energies according to claim 1 wherein:
   the detecting means includes two sensors at separate locations in the detection plane and a differential comparator connected to the output of the sensors to process the difference signal in a signal channel.

3. Apparatus for sensing discrete radiant energies according to claim 2 wherein:
   the comparator has a null condition at a preselected ratio of the energies sensed by the sensors at the locations in the detection plane.

4. Apparatus according to claim 1 for sensing discrete radiant energies from a body radiating light energy wherein:
   the sampling means includes an optical lens and an aperture plate.

5. Apparatus according to claim 4 wherein:
   the optical lens is an objective lens having a given image plane and optical axis; and
   the aperture plate is positioned in the image plane of the objective lens with an aperture in the plate centered on the optical axis of the lens.

6. Apparatus according to claim 1 for sensing discrete energies in the light spectrum wherein:
   the refracting means includes a dispersyn having a lens portion and a prism portion in a single optical element having the form of a peripheral portion of a convex lens.

7. Apparatus according to claim 6 wherein:
   the sampling means includes an optical aperture plate; and
   the refracting means includes a first dispersyn positioned with the focal plane of the convex lens at the aperture plate, thereby collimating the light beamed from the aperture.

8. Apparatus according to claim 7 wherein:
   the refracting means further includes a second dispersyn positioned in the collimated light beam from the first dispersyn and having a focal plane at the detection plane.

9. Apparatus for sensing a preselected altitude from atmospheric radiation near the horizon comprising:
   image forming means for generating an optical image of a portion of the horizon color profile in an image plane;
   wavelength dispersive refracting means for separating the optical image according to the wavelengths in the color profile portion at a detection plane; and
   detecting means in the detection plane for sensing the ratio of the color intensities at two bands of selected wavelengths.

10. Apparatus according to claim 9 wherein:
    the detecting means includes photodetectors positioned at locations in the detection plane corresponding to the selected wavelengths.

11. Apparatus according to claim 10 wherein:
    two photodetectors are positioned in the detection plane; and
    the detecting means also includes a comparator having two signal inputs connected to the respective photodetectors.

12. Apparatus according to claim 10 wherein:
    the photodetectors are two silicon photodiodes and the one photodiode is positioned at a location in the detection plane corresponding to wavelengths in the band of 430 nanometers to 490 nanometers.

13. Apparatus according to claim 12 wherein:
    the other photodiode is positioned at a location in the detection plane corresponding to wavelengths in the band of 340 nanometers to 380 nanometers.

14. Apparatus according to claim 9 wherein:
    the refracting means includes two dispersyns, each dispersyn having a convex lens portion and a prism portion, the dispersyns being positioned between the image plane and the detection plane with the refraction angles of the prism portions being additive.

15. Apparatus according to claim 14 wherein:
    the dispersyns are positioned between the image plane and the detection plane with the focal planes of the respective lens portions located respectively in the image plane and the detection plane.

16. A method of sensing the ratio of discrete wavelength bands in a portion of a colored field comprising:
    forming an optical image of the portion of the colored field;
    wavelength dispersive refracting the light from the optical image to form a refraction pattern of the colors in the field portion; and
    detecting the intensity of two refraction pattern at the discrete wavelength bands.

17. The method of sensing according to claim 16 including:
    comparing the intensities of the refraction pattern detected at the discrete wavelength bands.

18. The method of sensing according to claim 16 wherein:
    the step of refracting includes refracting the light from the optical image successively through two prisms.

19. The method of sensing according to claim 18 wherein:
    the step of refracting additionally includes collimating the light passing between the two prisms.

20. The method of sensing according to claim 18 wherein:
    the step of refracting additionally includes focussing the light from the optical image after successively refracting the light.

21. The method of sensing according to claim 16 wherein:
    the step of forming a single image includes focussing an image of the earth horizon in an aperture plate.

22. The method of claim 21 for sensing the earth-horizon wherein:
    the step of detecting includes selecting two discrete wavelength bands from a known combination of wavelength bands in the earth-horizon color profile.

23. The method of claim 22 for sensing the earth-horizon including:
    referencing the ratio of the detected intensities with the known combination of the two wavelength bands in the earth-horizon.

24. The method of claim 22 wherein:
    the step of selecting includes selecting the known combination from a stable combination of wavelength bands in the earth-horizon color profile.

25. The method of claim 24 wherein:
    the step of selecting includes selecting the wavelength bands from the range extending from 340 nanometers to 490 nanometers.

* * * * *